No. 809,373. PATENTED JAN. 9, 1906.
D. C. HOF & C. F. LADWIG.
PORTABLE GRAIN ELEVATOR.
APPLICATION FILED MAR. 14, 1904.
2 SHEETS—SHEET 1.
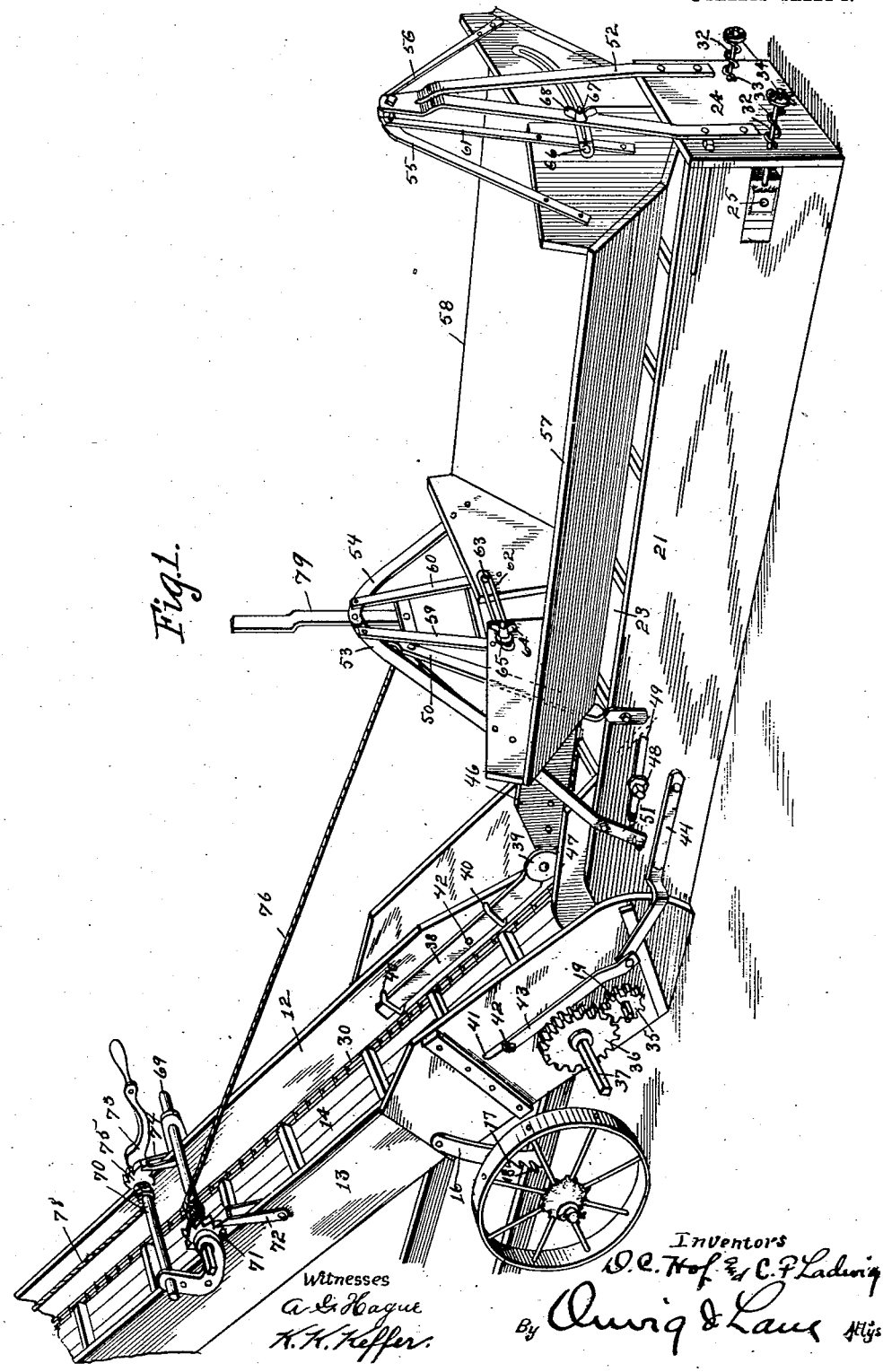

No. 809,373. PATENTED JAN. 9, 1906.
D. C. HOF & C. F. LADWIG.
PORTABLE GRAIN ELEVATOR.
APPLICATION FILED MAR. 14, 1904.
2 SHEETS—SHEET 2.
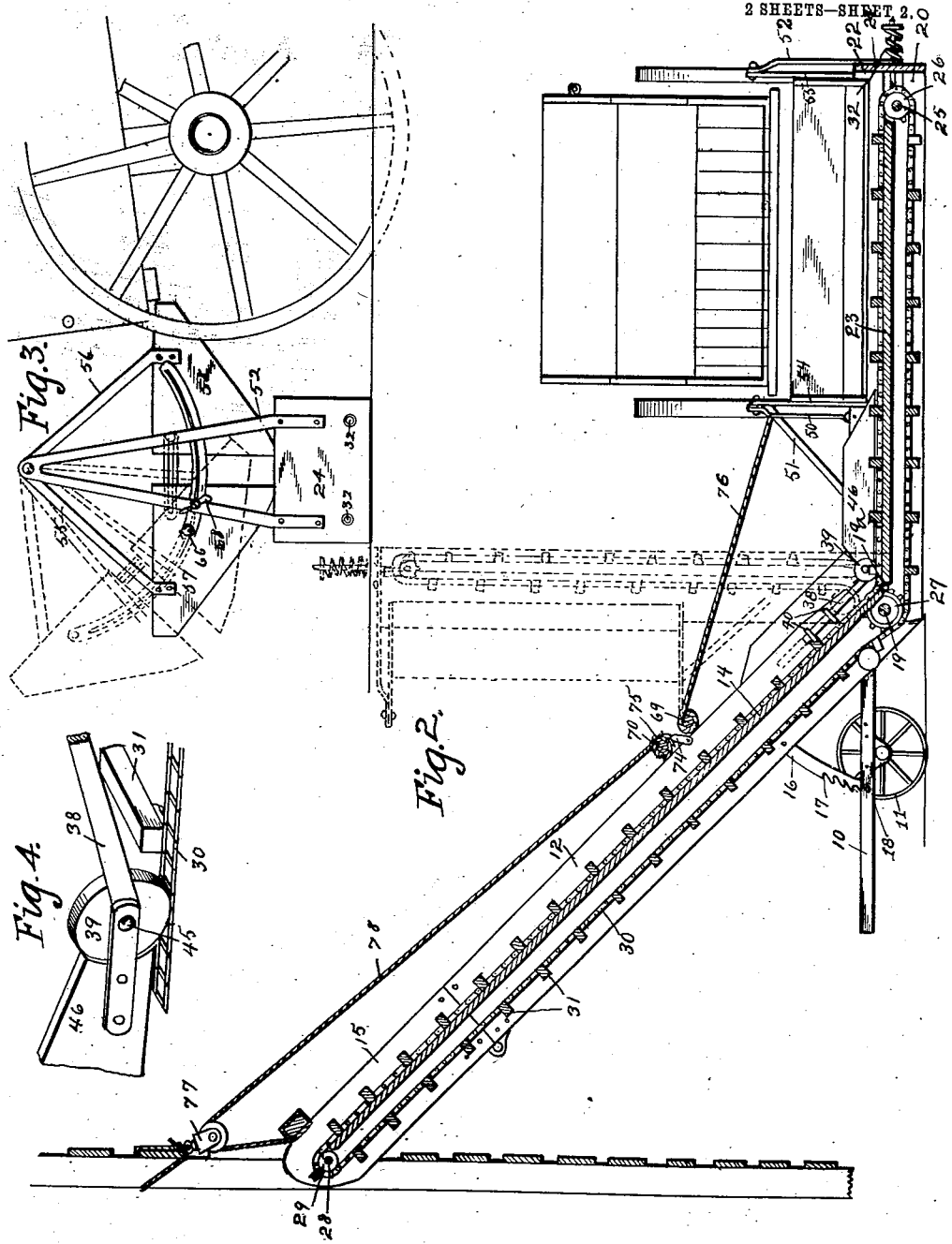
Witnesses
Inventors D. C. Hof & C. F. Ladwig
By Orwig & Lane Attys

UNITED STATES PATENT OFFICE.

DAVID C. HOF AND CHARLES F. LADWIG, OF NORA SPRINGS, IOWA.

PORTABLE GRAIN-ELEVATOR.

No. 809,373.     Specification of Letters Patent.     Patented Jan. 9, 1906.

Application filed March 14, 1904. Serial No. 198,116.

*To all whom it may concern:*

Be it known that we, DAVID C. HOF and CHARLES F. LADWIG, citizens of the United States, residing at Nora Springs, in the county of Floyd and State of Iowa, have invented a certain new and useful Portable Grain-Elevator, of which the following is a specification.

The objects of our invention are to provide a portable grain-elevator in which there is a continuous conveyer designed to receive grain from the rear end of the wagon-box and to carry it to one side of the wagon-box and elevate it into a storehouse or barn, and, further, to provide a device of this class in which the parts are capable of being folded together into a minimum amount of space, so that it can be moved from one place to another with but little difficulty.

A further object is to provide an adjustable hopper which can be easily adapted to any kind of grain, so as to direct the grain thrown into the hopper from the wagon-box onto the conveyer which is beneath it and also to enable the operator to easily adjust this hopper to the rear of the wagon-box, and, further, to provide a folding mechanism the parts of which automatically operate when one part is moved to a position adjacent to the other part, and, further, to provide a mechanism designed to be connected with the storehouse and the conveyer-frame for raising and lowering the upper end of the frame.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 shows in perspective the device except for the upper portion of the elevating conveyer-frame, which is broken away. Fig. 2 is a longitudinal sectional view of the complete device, showing the rear end of the wagon in position relative to the hopper and showing in dotted lines the elevated position of the hopper and the casing to which it is attached. Fig. 3 is a lower end elevation of the hopper and conveyer-casing, showing the rear end of a wagon-box and in dotted lines the hopper in one of its elevated positions, and Fig. 4 is a detail view of the idler for holding the conveyer-chains in position relative to the casing.

Referring to the accompanying drawings, I have used the reference-numeral 10 to indicate the truck to which the conveyer-casing is pivotally attached and which is mounted upon the wheels 11. Pivotally attached to one end of the truck 10 is the elevator-casing, comprising the side boards 12 and 13 and the bottom portion 14, mounted between said side boards. Hinged to the upper portion of the elevator-casing is an extension made with two side boards and a bottom portion and of the same width as the elevator-casing formed with the side boards 12 and 13 and the bottom 14. This extension I refer to by the numeral 15. There may be any number of these extensions 15 to the elevating-conveyer, depending entirely upon the desired height to which the grain has to be elevated, and each extension 15 which is attached is hinged to the extension immediately below it. Pivotally attached to the side boards 12 and 13 is a supporting-arm 16, said arms having a series of notches 17 in each of them designed to coact with the parts 18, which are mounted in the truck 10 to assist in supporting the elevator-casing and to prevent the free end of the truck from swinging upwardly into engagement with the lower portion of the elevator-casing. This arm 16 is capable of adjustment relative to the truck 10, so as to perform its function when the elevator is at any inclination of its range of movement relative to the truck 10.

Pivotally attached to the lower end of the elevator-casing by means of the rod $19^a$ is the side-delivery conveyer-casing 20, so arranged that the said casing 20 may be swung on the rod $19^a$ into the position shown in dotted lines in Fig. 2. This casing 20 has two side portions 21 and 22 in it and the bottom 23 between said side portions and also has the end portion 24 connecting the side portions. Connecting the ends of the sides 21 and 22 and extending parallel with the end portion 24 and adjacent to it is the shaft 25, having a sprocket-wheel 26 adjacent to each end of it, and one of said sprocket-wheels being adjacent to the side 21 and the other of said sprocket-wheels being adjacent to the side 22, both of said sprocket-wheels being between the sides 21 and 22. Mounted on the shaft 19 between the sides 21 and 22 and adjacent to each of said sides is a sprocket-wheel 27. Mounted at the upper end of the uppermost extension 15 and extending across it is a shaft 28, having two sprocket-wheels 29 thereon adjacent to the sides of said extension and between them. Passing around the sprocket-wheels 26, 27, and 29 on each side of the casing 20 and the elevating-casing is a sprocket-chain 30, said chains bearing a series of cross-pieces 31, which connect them together to form a complete conveyer, which serves not only to carry the grain to one side of the hopper, but also to elevate it as the conveyer is operated. This conveyer passes over and under the bottom 14 and over and under the bottom 23, as is shown clearly in the sectional view disclosed in Fig. 2, so that as the conveyer is operated the grain will be dragged over the bottom 23 and the bottom 14 to the extreme upper end of the elevating-conveyer. The shaft 25 is slidingly as well as rotatably mounted between the sides 21 and 22, and said shaft is springingly maintained in position relative to the end portion 24 by means of the rods 32 and the springs 33, mounted on said rods, which springs engage the outer surface of the end 24 and the inner surface of the adjustable plate 34. This shaft 25 is held springingly in position relative to the end piece 24 to maintain the conveyer in a taut condition constantly as it is being operated. The tension of the springs 33 can be increased or diminished by adjusting the plates 34. Mounted adjacent to the extreme end of the shaft 19 and outside of the side board 13 is a gear 35 in mesh with the gear 36, which is mounted on the shaft 37, which shaft 37 is designed to be connected with an engine-motor or other driving mechanism for operating the conveyer.

Slidingly attached to the lower end of each of the side pieces 12 and 13 is an idler bearing-bar 38, having the idler 39 rotatably mounted at the lower end of it, said idlers being designed to engage the upper portion of the chains 30 and maintain said chains, which form a portion of the conveyer, in position relative to the bottom portions 14 and 23. These sliding bars 38 are held in position relative to the sides by the staples 40. In each of the sides 12 and 13, adjacent to the bars 38, is a slot 41, through which the bolt 42 is designed to pass, which bolt extends through the bars 38 and outwardly therefrom through the slot 41 and and through the bar 43, which is on the outside of each of the sides 12 and 13 and extends parallel with the bars 38.

Firmly attached to the outside of each of the sides 21 and 22 is an arm 44, said arms being pivotally attached to the adjacent arm 43. It will be seen that as the conveyer-casing 21 is swung upwardly on the rod 19ª the bars 43 acting on the arms 44 will cause the bars 38 to be slid upwardly, and thus throw the idler 39 upwardly and out of the corner between the elevator-casing 20, as shown clearly in dotted lines in Fig. 2. Then as the casing 20 is moved to the position shown in Figs. 1 and 2 the idlers 39 will take their normal position, as shown in Fig. 1, and these idlers in this position will prevent the conveyers from being drawn upwardly and out of engagement with the bottoms 14 and 23. The idlers 39 are rotatably mounted on the pivots 45, and attached to the pivots and extending away from the idlers 39 in the opposite direction from the bars 38 are the guides 46 and 47, said guides being slidingly held in position relative to the sides 21 and 22, respectively, by means of a bolt 48, which passes through a slot 49 in each of the sides 21 and 22, so that as the casing 20 is swung on the rod 19ª the guides 46 and 47 will move longitudinally of the casing 20, and thus be thrown outwardly a slight distance when the casing 20 is thrown toward the elevator-casing. These guides 46 and 47 are designed to prevent the grain from getting into the operative parts of the mechanism and keeping it toward the longitudinal center of the conveyer as the conveyer is operated.

Attached to the sides 21 and 22 is a hopper-support 50, which is connected at its upper end and is separated at its lower ends and the parts of which diverge from its upper portion to the points of attachment to the sides 21 and 22. We have provided a brace 51 on each side of the casing 20, one of which is attached at its lower end to the side 21 and at its upper end to the hopper-support 50 and the other of which is attached at its lower end to the side 22 and at its upper end to the hopper-support 50. This hopper-support 50 is mounted at that end of the casing 21 which is nearest the elevator-casing. Attached to end 24 of the casing 21 is a hopper-support 52, which is constructed similarly to the hanger-support 50, except that the diverging arms are attached to the end portion 24 instead of to the sides 21 and 22.

Pivotally attached to the upper end of the supporting member 50 are the hanger-bars 53 and 54. Pivotally attached to the support 52 are the hanger-bars 55 and 56. Firmly attached to the lower end of the hanger-bars 53 and 55 between said bars and extending longitudinally of the casing 20 is the inclined side 57 of the hopper. Firmly attached to the lower ends of the hanger-bars 54 and 56 is a side 58, corresponding to the side 57. Said side is mounted between the bars 54 and 56 and is also above the casing 20. Connecting the hanger-bars 53 and 54 and the ends of the sides 57 and 58, respectively, are the braces 59 and 60, so arranged that the sides 57 and 58 will be held firmly, by means of these hanger-bars and supports, at one end of the hopper. At the other end of the hopper there are two braces 61, corresponding exactly to the braces 59 and 60 except that they are on the opposite end from the hopper from these braces and are designed to firmly maintain the hanger-bars 55 and 56 in position relative to the ends of the sides 57 and 58 of the hopper. Connecting the sides 57 and 58 of the hopper is a link 62, pivotally mounted on the pin 63, which is on the side 58 of the hopper. Said link is also slidingly mounted on the screw-threaded bar 64, which is on the side 57 of the hopper. A thumb-screw 65 is mounted on the screw-threaded bar 64 and is designed to be turned into engagement with the link 62 to hold the sides 57 and 58 of the hopper in position relative to each other, so that an opening will be formed between these sides 57 and 58 to allow the grain to be dumped through this opening and onto the conveyer which is beneath it. The size of this opening can be easily regulated by adjusting the parts 57 and 58 relative to each other and maintain these parts in position relative to each other by turning the thumb-screw 65 into engagement with the link 62. Pivotally attached to the end of the hopper which is nearest the support 52 and on the side 57 is a slotted guide 66. Extending through the slot in said guide and through an opening in one of the diverging arms of the support 52 is a bolt 67, having the thumb-screw 68 on its outer end. This slotted guide and the thumb-screw and bolt are so arranged that the entire hopper can be swung from a position directly over the conveyer to a position at one side of the conveyer and maintained in that position by adjusting the thumb-screw and holding the slotted guide in position relative to the support 52. Extending across the elevator conveyer-casing and rotatably connected therewith are the windlasses 69 and 70, the windlass 69 having the ratchet-wheel 71 near one end of it and the pawl 72, which is pivotally attached to the side 13 of the elevator conveyer-casing, in engagement with said ratchet-wheel 71. This pawl is designed to be thrown out of and into engagement with the wheel 71 when desired. Each of these windlasses 69 and 70 has a squared head, and the crank 73 is designed to be used on these heads for turning the windlasses. A pawl 74 is pivotally attached to the side 12 of the elevator conveyer-casing and is designed to perform the same function relative to the ratchet-wheel 75 which is on the windlass 70 as the pawl 72 performs with the ratchet-wheel 71. Attached at one end to the windlass 69 and at the other end to the support 50 is the rope 76, so that as the windlass 69 is operated the casing 20 and its attachments will be raised to a position shown in dotted lines in Fig. 2 or lowered to a position shown in Fig. 1, the object of the windlass being to raise the casing 20 to a position out of the way, so that a wagon can be driven over the ground-surface where the casing 20 rests when in its extended position, and when the wagon has been driven to the desired position by operating the windlass in the opposite direction the casing 20 can be lowered to the position shown in Fig. 3 of the drawings relative to the wagon-box. Connecting the upper end of the uppermost extension 15 and passing over a pulley 77, which pulley is designed to be attached to the storehouse and attached at its other end to the windlass 70, is a rope 78, so that as the windlass 70 is operated the upper end of the conveyer and the elevating conveyer-casing can be raised or lowered. A limiting-arm 79 is attached to the support 50, designed to limit the movement of the casing 20 when said stop engages the elevating conveyer-casing.

In practical operation and assuming that a power machine of some kind is operatively connected with the conveyer and assuming that the parts are assembled as shown in Fig. 1 and that the upper end of the conveyer is in a storehouse and that it is desired to unload a load of grain the operator swings the casing 20 to a position shown in dotted lines in Fig. 2 by operating the windlass 69 and the wagon is driven to the position shown in Fig. 2. The casing 20 is then dropped to position on the ground-surface after having swung the hopper to the position shown in dotted lines in Fig. 3, so that it will clear the rear end of the wagon-box as the casing 20 is moved to its normal position. The hopper is then swung to a normal position, so that the opening between the sides 57 and 58 in it are directly above the conveyer, as shown in Fig. 1. The conveyer is then set into operation, and the grain is allowed to fall into the hopper from the rear end of the wagon-box, and it will thus be fed through the hopper onto the conveyer and elevated into the storehouse. The operation is repeated whenever a new load is drawn to a box adjacent to the hopper. In practical use it may be desirable to lower the rear end of the wagon-box slightly by driving the rear wheels of the wagon into holes dug in the ground for that purpose.

Having thus described our invention, what we claim, and desire to secure by Letters Patent of the United States therefor, is—

1. In a device of the class described, the combination of a two-part pivotally-mounted hopper, means for maintaining the parts a slight distance away from each other, and means for maintaining the pivotally-mounted hopper in various positions on its pivotal movement.

2. In a device of the class described, two supports, a two-part hopper pivotally attached to said supports and the parts of the hopper capable of pivotal movement toward and away from each other.

3. In a device of the class described, two supports, a two-part hopper pivotally attached to said supports and the parts of the hopper capable of pivotal movement toward and away from each other, and means for maintaining the parts of the hopper in position relative to each other.

4. In a device of the class described, two supports, a two-part hopper pivotally attached to said supports and the parts of the hopper capable of pivotal movement toward and away from each other, and means connected with said support and with said hopper for maintaining the hopper in position relative to said support.

5. In a device of the class described, two supports, a two-part hopper pivotally attached to said supports and the parts of the hopper capable of pivotal movement toward and away from each other, means for maintaining the parts of the hopper in position relative to each other, and means connected with said support and with said hopper for maintaining the hopper in position relative to said support.

6. In a device of the class described, two supports, a two-part hopper pivotally attached to said supports and the parts of the hopper capable of pivotal movement toward and away from each other, and a conveyer mounted beneath said hopper.

7. In a device of the class described, two supports, a two-part hopper pivotally attached to said supports and the parts of the hopper capable of pivotal movement toward and away from each other, means for maintaining the parts of the hopper in position relative to each other, and a conveyer mounted beneath said hopper.

8. In a device of the class described, two supports, a two-part hopper pivotally attached to said supports and the parts of the hopper capable of pivotal movement toward and away from each other, means connected with said support and with said hopper for maintaining the hopper in position relative to said support, and a conveyer mounted beneath said hopper.

9. In a device of the class described, two supports, a two-part hopper pivotally attached to said supports and the parts of the hopper capable of pivotal movement toward and away from each other, means for maintaining the parts of the hopper in position relative to each other, means connected with said support and with said hopper for maintaining the hopper in position relative to said support, and a conveyer mounted beneath said hopper.

10. In a device of the class described, an elevating conveyer-casing, a lateral conveyer-casing hinged to the elevating conveyer-casing, a conveyer extending longitudinally of said casings and operatively mounted therein, a slidingly-mounted idler connected with the lower end of the elevating conveyer-casing designed to maintain the conveyer in position relative to the bottom of the casings, and a slidingly-mounted guide designed to force the substance to be carried by the conveyer toward the center of it.

11. In a device of the class described, an elevating conveyer-casing, a lateral conveyer-casing hinged to the elevating conveyer-casing, a conveyer extending longitudinally of said casings and operatively mounted therein, a slidingly-mounted idler connected with the lower end of the elevating conveyer-casing designed to maintain the conveyer in position relative to the bottom of the casings, and means for swinging the lateral conveyer-casing toward the elevating conveyer-casing.

12. In a device of the class described, an elevating conveyer-casing, a lateral conveyer-casing hinged to the elevating conveyer-casing, a conveyer extending longitudinally of said casings and operatively mounted therein, a slidingly-mounted idler connected with the lower end of the elevating conveyer-casing designed to maintain the conveyer in position relative to the bottom of the casings, means for swinging the lateral conveyer-casing toward the elevating conveyer-casing, and means for limiting the movement of the lateral conveyer-casing toward the elevating conveyer-casing.

13. In a device of the class described, an elevating conveyer-casing, a lateral conveyer-casing hinged to the elevating conveyer-casing, a conveyer extending longitudinally of said casings and operatively mounted therein, a slidingly-mounted idler connected with the lower end of the elevating conveyer-casing designed to maintain the conveyer in position relative to the bottom of the casings, and means attached to the lateral conveyer-casing and operatively connected with the idler for moving said idler upwardly as the lateral conveyer is swung on its hinge toward the elevating-conveyer.

14. In a device of the class described, an elevating conveyer-casing, a lateral conveyer-casing hinged to the elevating conveyer-casing, a conveyer extending longitudinally of said casings and operatively mounted therein, a wheel-bearing truck connected with the elevating conveyer-casing, means for holding the truck in position relative to the elevating conveyer-casing when the said casing is elevated.

15. In a device of the class described, an elevating conveyer-casing, a lateral conveyer-casing hinged to the elevating conveyer-casing, a conveyer extending longitudinally of said casings and operatively mounted therein, a wheel-bearing truck connected with the elevating conveyer-casing, and means designed to be connected with a storehouse and to the elevating conveyer-casing and its extensions for raising and lowering the free end of the elevating conveyer-casing.

16. In a device of the class described, an elevating conveyer-casing, a lateral conveyer-casing hinged to the elevating conveyer-casing, a conveyer extending longitudinally of said casings and operatively mounted therein, a wheel-bearing truck connected with the elevating conveyer-casing, means for holding the truck in position relative to the elevating conveyer-casing when the said casing is elevated, and means designed to be connected with a storehouse and to the elevating conveyer-casing and its extensions for raising and lowering the free end of the elevating conveyer-casing.

17. In a device of the class described, an elevating conveyer-casing, a lateral conveyer-casing hinged to the elevating conveyer-casing, a conveyer extending longitudinally of said casings and operatively mounted therein, adjustable means connected with the end of the lateral conveyer-casing designed to maintain the conveyer in a taut position, a pivotally-mounted two-part hopper, the parts of said hopper being capable of pivotal movement relative to each other, and means for maintaining the parts of said hopper in position relative to each other.

18. In a device of the class described, an elevating conveyer-casing, a lateral conveyer-casing hinged to the elevating conveyer-casing, a conveyer extending longitudinally of said casings and operatively mounted therein, adjustable means connected with the end of the lateral conveyer-casing designed to maintain the conveyer in a taut position, a pivotally-mounted two-part hopper, the parts of said hopper being capable of pivotal movement relative to each other, means for maintaining the parts of said hopper in position relative to each other, and means for maintaining the hopper in various positions of its pivotal movement.

19. In a device of the class described, an elevating conveyer-casing, a lateral conveyer-casing hinged to the elevating conveyer-casing, a conveyer extending longitudinally of said casings and operatively mounted therein, adjustable means connected with the end of the lateral conveyer-casing designed to maintain the conveyer in a taut position, a pivotally-mounted two-part hopper, the parts of said hopper being capable of pivotal movement relative to each other, means for maintaining the parts of said hopper in position relative to each other, means for maintaining the hopper in various positions of its pivotal movement, and means for swinging the lateral conveyer-casing and the hopper toward the elevating conveyer-casing.

20. In a device of the class described, an elevating conveyer-casing, a lateral conveyer-casing hinged to the elevating conveyer-casing, a conveyer extending longitudinally of said casings and operatively mounted therein, adjustable means connected with the end of the lateral conveyer-casing designed to maintain the conveyer in a taut position, a pivotally-mounted two-part hopper, the parts of said hopper being capable of pivotal movement relative to each other, means for maintaining the parts of said hopper in position relative to each other, means for maintaining the hopper in various positions of its pivotal movement, means for swinging the lateral conveyer-casing and the hopper toward the elevating conveyer-casing, and means for limiting the movement of the hopper and the lateral conveyer-casing relative to the elevating conveyer-casing.

DAVID C. HOF.
CHARLES F. LADWIG.

Witnesses:
S. M. MITCHELL,
H. F. SCHNEDLER.